Dec. 30, 1947.  W. J. MITCHELL  2,433,473
ARM FOR AIR PICK-UP SYSTEMS
Filed Feb. 14, 1944  3 Sheets-Sheet 2

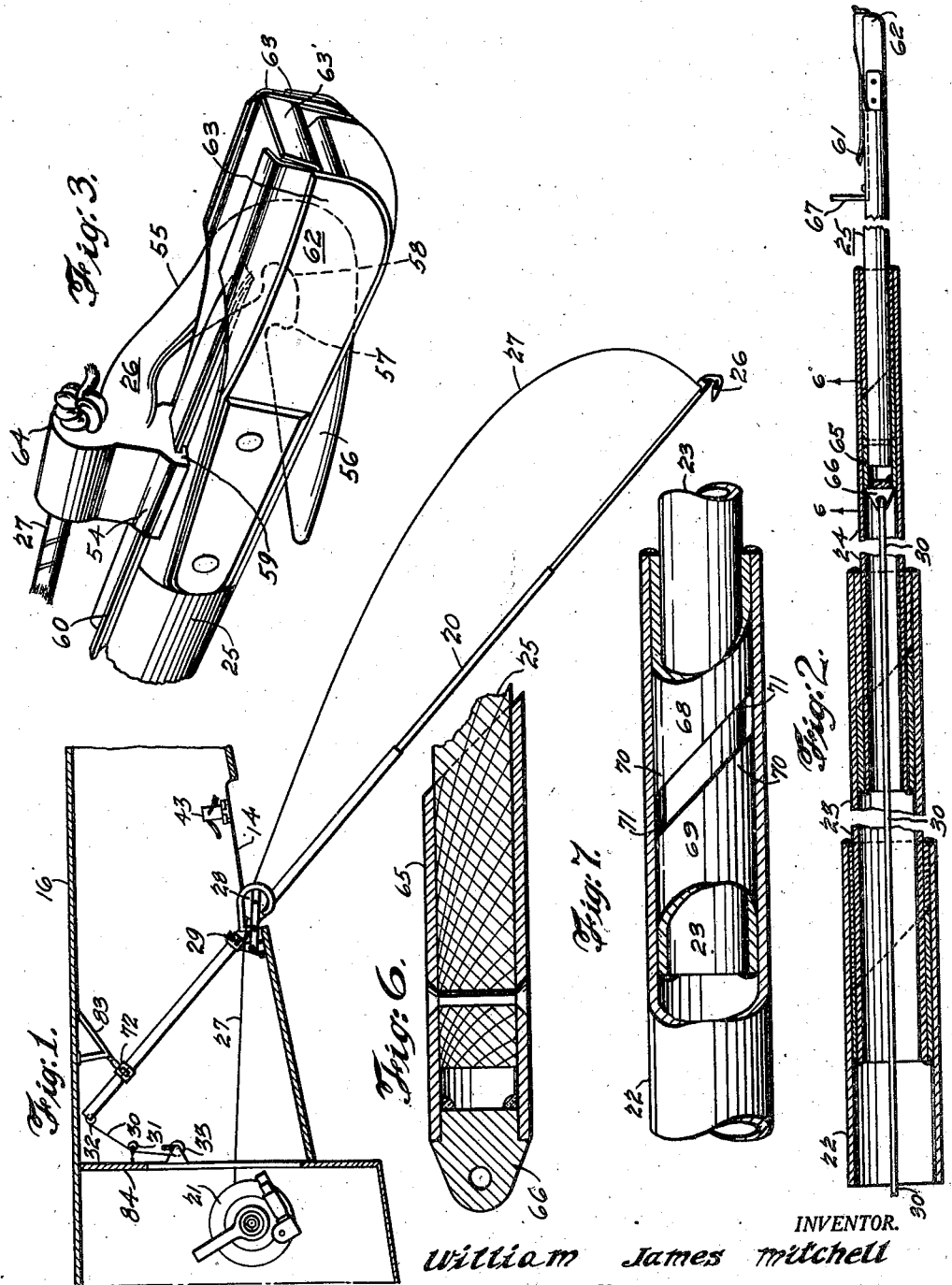

INVENTOR.
William James Mitchell
BY
Hyde W. Ballard
ATTORNEY.

witnesses:
Sarah Street
Ruth Becker

Dec. 30, 1947.  W. J. MITCHELL  2,433,473
ARM FOR AIR PICK-UP SYSTEMS
Filed Feb. 14, 1944  3 Sheets—Sheet 3
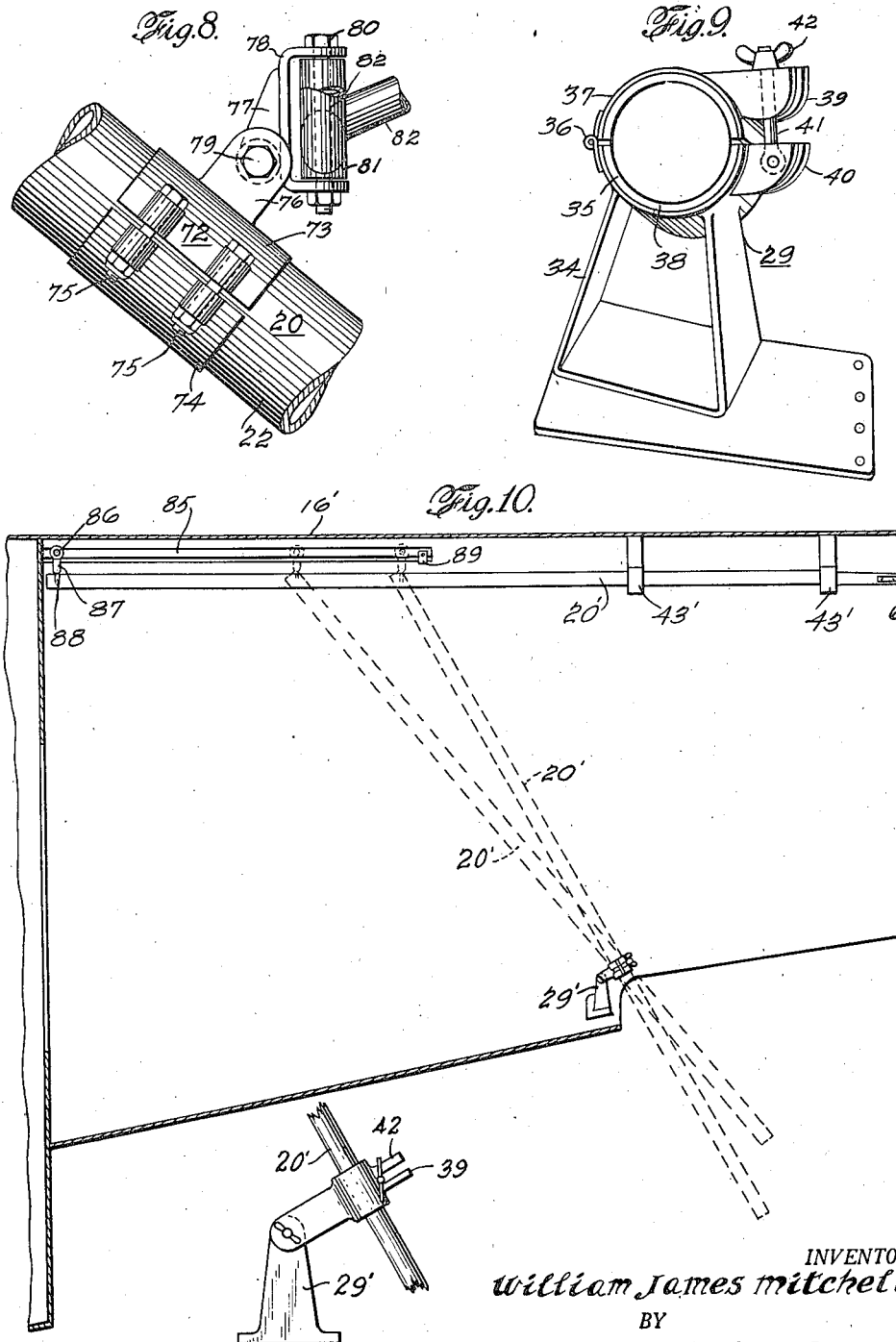
INVENTOR.
William James Mitchell
BY
Hyde W. Ballard
ATTORNEYS
witnesses:
Saul Strut
Ann H. Backus Patented Dec. 30, 1947

2,433,473

UNITED STATES PATENT OFFICE 2,433,473

ARM FOR AIR PICK-UP SYSTEMS

William James Mitchell, Wilmington, Del., assignor to All American Aviation, Inc., Wilmington, Del., a corporation of Delaware Application February 14, 1944, Serial No. 522,232

12 Claims. (Cl. 258—1.2)

My invention relates in general to aviation and more particularly to apparatus for picking up grounded loads by an aircraft in flight.

In pick-up devices of this kind, it is customary to project from the airplane or other aircraft an arm with a hook at its lower end in such manner that, as the plane passes over the station, the arm engages a suitably mounted ground loop to which the object to be picked up is connected. The invention relates to a novel form of pick-up arm and associated apparatus capable of use on both land planes and sea planes and capable of picking up either inanimate loads, such as baggage or mail, or live loads, such as gliders or powered aircraft.

According to a preferred embodiment, the invention comprises a telescopic arm mounted inside the hull of a sea plane and adapted to project down through a hatch or door in the bottom of the hull. The arm may comprise telescoping sections having suitable means for placing the sections in alignment when the arm is extended so as to properly position the pick-up hook which is releasably engaged with the lower end of the arm. The upper arm section is suitably swiveled from a support on the underside of the deck of the hull and suitable clamps are provided for stowing the collapsed arm away when not in use and for positioning the arm for extension into proper pick-up position. Suitable means including a control cable extending down through the hollow sections and a windlass on the inside of the hull are provided for extending and retracting the arm. The pick-up apparatus also includes an automatic winch located in the hull adjacent the pick-up arm, on which is wound the pick-up line to which the pick-up hook is connected. The line may pass over suitable guiding devices including a special guide pulley mounted at the edge of the hatch. This guide pulley may be mounted for movement into operative position to receive the pick-up line or into inoperative position to permit closing of the hatch when the pick-up apparatus is not in use. If desired, instead of mounting the swivel connection on a fixed support, this connection may be mounted on a monorail extending along the deck of the hull to permit adjusting the angle of the pick-up arm for pick-up purposes and to facilitate stowing away of the pick-up arm.

The invention also includes certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a diagrammatic detail showing how the arm and other pick-up apparatus are related to the hull of the aircraft;

Fig. 2 is a longitudinal section through the pick-up arm in fully extended position;

Fig. 3 is a detail showing the hook retainer for releasably mounting the hook at the tip of the arm;

Fig. 6 is a sectional detail of the upper end of the last arm section as seen from 6—6 (Fig. 2) showing the cable attachment fitting and aligning bevel.

Fig. 7 is a partly broken away detail illustrating the bevel arrangement for aligning the pick-up arm sections;

Fig. 8 is a detail of the swivel mounting for the arm;

Fig. 9 is a detail of an arm hold-down saddle; and

Fig. 10 illustrates a modified form of mounting.

Fig. 11 is a detail of a swinging mount.

Like reference characters denote like parts in the several figures of the drawings.

While certain novel features of the invention are disclosed herein with considerable detail with respect to certain particular forms of the invention, it is not desired to be limited to such details since many changes and modifications may well be made without departure from the spirit of the invention in its broadest aspect.

Figure 4:
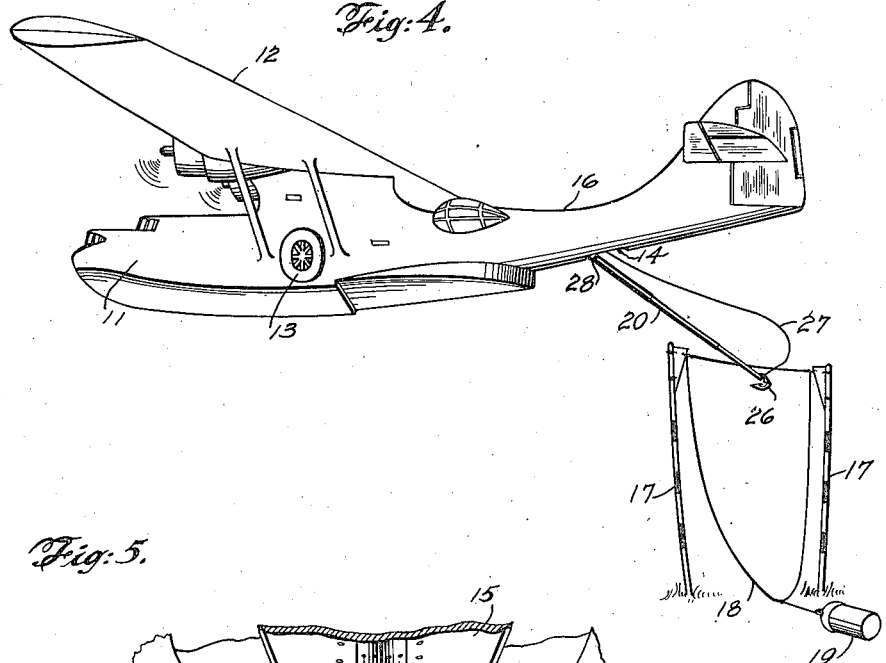
Fig. 4 is a perspective showing diagrammatically a pick-up by one type of sea plane on which the pick-up apparatus may be used.

Referring now to the drawings and more particularly to Figs. 1 and 4, the airplane used for the purpose of illustrating the invention is of the amphibious type having the usual hull 11, wings 12 and landing gear 13. The hull has a tunnel gun door 14 in its bottom closed by a hatch 15 and an upper wall or deck 16.

The pick-up arm may be used for engaging any desired type of ground equipment. For purposes of illustration, a ground station is diagrammatically shown as comprising two poles 17 set in the ground with a pick-up loop 18 releasably suspended between the poles and connected to a load or object 19 to be picked up. For further details of a suitable ground station, reference is made to Plummer application, Serial No. 411,961, filed September 23, 1941, now Patent No. 2,367,607, dated January 16, 1945.

The apparatus comprises generally a pick-up arm 20 and an automatic winch 21. The pick-up arm 20 comprises telescoping sections 22, 23, 24 and 25 having a releasable hook 26. The pick-up line 27 connects the hook 26, runs over a guide pulley 28 and is wound on the automatic winch 21. The pick-up arm 20 when in operative position rests in a clamp 29. The collapsing of the pick-up arm 20 is effected by a control cable 30 extending through the hollow pick-up arm over guide pulleys 31 and 32 to a hand windlass 33.

The winch 21 may be of the automatic type having means for automatically applying a brake, the operation being controlled by outward movement of the pick-up line 27 in such manner to apply an increasing accelerating force to the pick-up line and load. It will be understood that this winch 21 will have a suitable drive motor by which the pick-up line may be either paid out or reeled in at the will of the pick-up operator, by operating switch controls. One type of automatic winch is disclosed in Plummer application, Serial No. 423,999, filed December 22, 1941, now Patent No. 2,373,414, dated April 10, 1945.

Figure 5:
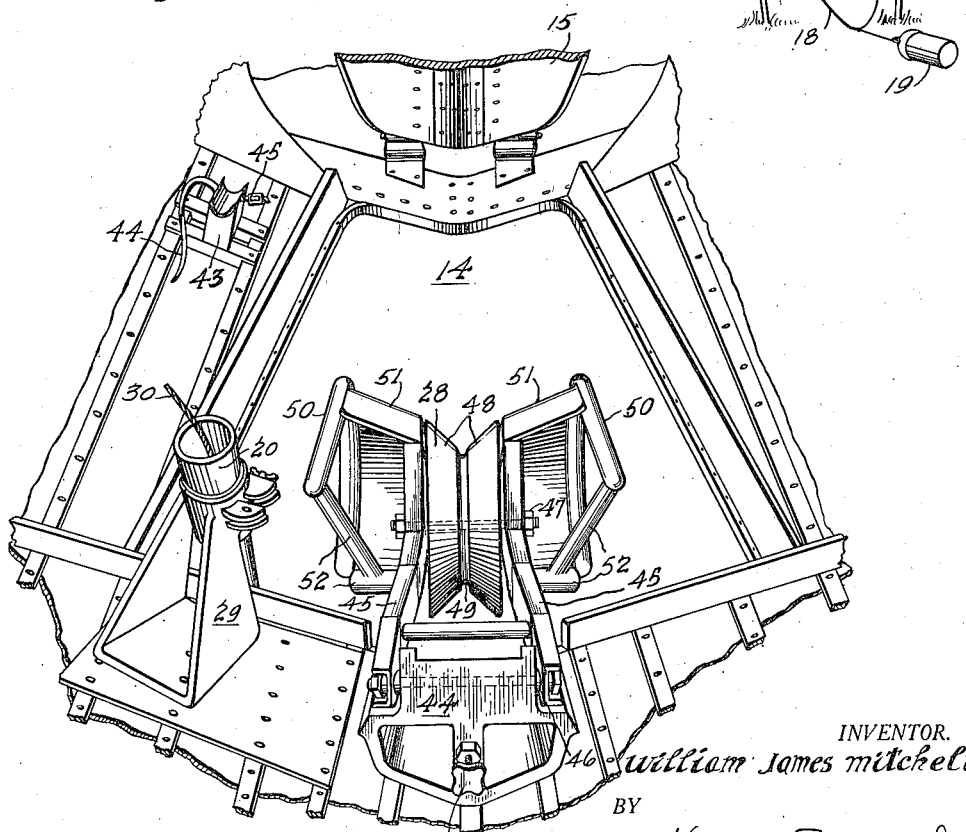
Fig. 5 is a detail looking from inside the hull out through the door and showing the relation between the pick-up arm and guide pulley.

Referring now more particularly to Figs. 5 and 9, the positioning clamp 29 will now be described. This clamp comprises a support 34 holding a curved saddle or socket 35 to which is hinged at 36 a curved cap 37. The saddle 35 and cap 37 may be lined by suitable material, such as leather 38, to yieldably engage the pick-up arm 20. The parts of the positioning clamp 29 have suitable ears 39 and 40, to the latter of which is pivoted a clamp screw 41. A wing nut 42 clamps the sections together to firmly grip the pick-up arm 20 therebetween.

The storage clamp 43 may be of a generally similar construction having a saddle but the cap may desirably be replaced with a strap 44 and buckle 45 to facilitate quick operation. The storage clamp may be secured to a convenient part of the hull and may engage the bottom section 25 of the pick-up arm to hold the retracted arm in secure storage position.

Referring now to Figs. 1 and 5, the guide pulley 28 is positioned at the edge of the door 14 and supported from a mount 44 which may also be used to position a machine gun (not shown). The supporting structure comprises a suitable frame 45 mounted upon a horizontal swivel 46 in the mount. The frame 45 and shaft 47 journal the pulley 28 which has suitably beveled faces 48 and a central groove 49. The frame 45 supports stationary curved guide members 50 to which stationary aprons 51 are suitably secured. Guide members 50 are supported outwardly of the frame 45 by suitably welded tubular members 52. The aprons 51 cooperate with the bevel faces 48 of the pulley 28 to guide the pick-up line 27 into the groove of the pulley, should the pick-up line become accidentally displaced from the pulley during the pick-up operation. They also permit the hook 26 and the load container 19 to be drawn over the pulley without difficulty.

The guide pulley 28 is adapted to occupy an operative position during a pick-up operation and to be retracted into inoperative position so as to enable the hatch 15 to be closed. In operative position the pulley frame is suitably secured in position by a screw 53.

Referring now to Fig. 3, the hook 26 comprises a slider 54 to which is secured a shank 55 whose end is curved to form a bill 56. The bill is provided with staggered barbs 57 and 58. The slider or cleat 54 has flanges 59 extending around and under the edges of a track 60 having an outturned end 61 (Fig. 2) to facilitate positioning the hook. The last section 25 of the arm is provided with a hook retainer 62 including spring side walls 63 and a spring end wall 63' for releasably holding the hook 26 in operative position. The hook is provided with a socket 64 having an opening through which the line 27 passes, a suitable knot being placed in the line to secure the hook and line together.

It will be understood that in use the hook 26 is slipped over the end 61 of track 60 and is retained in the hook retainer 62 until the hook is engaged by the pick-up loop 18. This engagement pulls the hook loose against the resilience of springs 63 and 63'.

Referring now also to Figs. 2, 6 and 7, the pick-up arm 20 is made up of three tubular metal sections 22, 23, 24 and a wooden section 25. The wooden section 25 has rivetted to its upper end a metal ferrule 65 (Fig. 6) to which is welded an apertured ear 66 for connection with the control cable 30. The control cable 30 passes through the hollow sections. The wooden section 25 has a stop member 67 attached thereto for engaging the other sections in retracting the arm upon winding up of control cable 30 on windlass 33.

The arm sections are prevented from coming apart when extended by suitable tubular members secured to the adjoining sections and having a special relationship for lining up the sections so as to keep the hook 26 in proper position for a pick-up operation with its bill 56 in a downward position. Since the self-aligning tubular abutments connecting the several sections are similar in construction, only one set will be described in detail.

Referring to Fig. 7, the upper section 22 has an inner tube 68 suitably welded thereto, the tube 68 being cut along a plane making substantially a 45° angle with its axis. This tube cooperates with a similar tube 69 cut with a complementary angle and welded to the outer surface of the next lower section 23. The abutting tubes 68 and 69 thus have mating bevel surfaces which provide in effect projecting tongues 70 and sockets 71 for receiving these tongues. When the arm 20 is extended for a pick-up operation, it will be seen that, as the abutments engage, each projection 70 will seek the low point 71 of its engaging abutment, the tubes being free to rotate until proper nesting of the bevel surfaces takes place. This insures proper registration of adjoining sections with each other and since the upper section 22 is non-rotatably mounted in the clamp 72, proper alignment of the hook 26 is insured.

Referring now also to Fig. 8, the upper section 22 is clamped between the halves 73, 74 of a suitable clamp 72 having suitable clamp bolts 75 passing through the ears thereof. A padding of leather or other suitable material may be placed between arm and clamp if desired. The clamp 72 has projecting lugs 76 which embrace the opposite sides of a flange 77 secured to a yoke 78. A pivot bolt 79 passes through the spaced ears and flange. The yoke 78 has a pivot bolt 80 passing through the support 81 welded to ends of rods 82 forming the bracket 83 suspended from the deck 16. Thus the connection involving the perpendicularly related swivel bolts 79, 80 provides in effect a universal swivel connection enabling the pick-up arm 20 to be swiveled to various angular positions such as for use and for storage.

The upper end of the section 22 has mounted thereon a guide pulley 32 over which control cable 30 passes. A further guide pulley 31 is universally mounted on the bulkhead 84 for guiding the control cable 30 to the windlass 33.

It will be appreciated that the support 72 for universally supporting the pick-up arm is mounted to one side of the center line of the plane. The operating clamp 29 is also mounted off-center, thus positioning the pick-up arm in a geometric plane at an angle to vertical when the ship is flying on even keel. These points of support for the pick-up arm may, of course, be changed with different planes and to obtain different pick-up arm angles. The main pick-up winch 21 and the skirted guide pulley 28 may be located along the central axis of the ship or off-center on the opposite side of the center line from the pick-up arm so as to be more or less in a vertical plane with the hook when the pick-up arm is extended.

Referring now to the modification shown in Fig. 10, the construction of the pick-up arm is similar to that described above except that instead of providing a swivel connection between the arm 20' and the upper deck 16' of the hull, a monorail 85 is provided. This monorail 85 is suspended from deck 16' and supports a trolley roller 86 from which a hanger 87 is suspended, the hanger being connected by a suitable universal joint 88 with the upper end of the pick-up arm 20'. In this construction, the operating and storage clamps 29' and 43' will be similar to those described above except that the operating clamp may be swiveled or adjustably mounted to permit varying the angle of the operative position of the pick-up arm 20'. The storage clamp 43' may be placed high up out of the way. A suitable clamping device 89 will also be provided for holding the trolley in proper adjusted position.

*Operation*

When the pick-up apparatus is not in use, the arm 20 will be stowed away in collapsed condition wholly within the hull or fuselage, the end section 25 being clamped in storage clamp 43 on the framework of the plane. The pick-up line 27 will be wholly wound on the main pick-up winch 21 with the hook 26 positioned adjacent the winch. The hatch 15 will be closed and the skirted guide pulley 28 swung into inoperative position wholly within the plane.

To place the pick-up arm 20 in readiness for a pick-up operation, the hatch will be raised and the pick-up arm will be released from its storage clamp 43. Sufficient line 27 is unwound from the pick-up winch 21 to enable the pick-up operator to place the pick-up hook 26 in the hook retainer 62 on the end of the pick-up arm. The pick-up arm is then manipulated or swung to an inclined position and secured by the clamp 29 at the edge of the hatch. The windlass 33 is then unwound to permit the telescoping sections of the pick-up arm to extend, the force of gravity being sufficient to cause the sections to extend by their own weight. As the sections extend, sufficient additional pick-up line 27 will be paid off from the pick-up winch until the pick-up arm 20 reaches its fully extended position. It will be noted that the beveled cam members 68 and 69 serve to align the sections so that the pick-up hook 26 will be facing forward and downward in a proper position for engaging the ground loop 18.

The pilot will fly the plane in such manner as to bring the pick-up arm 20 in line with the ground station in a path between the poles 17 thereof in such manner that the upper ply of loop 18 will engage the pick-up arm somewhere above the hook 26. The steps caused by the telescopic construction of the pick-up arm are in the proper direction to permit unimpeded sliding of the loop down the arm into the pick-up hook 26.

The resistance offered by the pick-up loop, and the load 19 connected thereto, pulls the pick-up hook loose from the hook retainer 62 and starts to unwind the pick-up line 27 from the winch 21, the pick-up arm playing no further part in the particular pick-up operation. The peculiar properties of the material of the pick-up line or of the ground loop help to overcome the inertia of the drum of pick-up winch 21 to bring it up to proper payoff speed and the rotation of the drum is retarded by the main brake thereof in such manner as to effectively minimize and absorb the shock on the load, the plane and on the pick-up equipment. This operation is explained more in detail in application, Serial No. 423,999 above referred to.

After the load 19 has gotten up to speed and the winch 21 stops paying out, the winch motor may be operated in such way as to reel in the pick-up line 27 to bring the load up through the door 14 where the winch operator will remove the load and ground loop from the hook and then cause the winch to fully wind up the line 27. The pick-up arm 20 will then be retracted by winding the windlass 33, the control cable 30 causing the sections to telescope to retracted position. The pick-up operator then opens the positioning clamp 29 and swings the retracted arm 20 inside the plane where it is held by the stowing clamp 43. The skirted guide pulley and frame is then swung inside the plane and the hatch 15 closed and suitably tightened to be made watertight.

It is obvious that this operation may be varied somewhat, depending upon the desires of the particular operator and the particular design of the equipment and the type of plane. Particularly, it will be apparent that the number of telescopic sections in the pick-up arm 20 may vary in accordance with the installation contemplated; and that in rough weather it may be desirable for the operator to raise the arm before attempting to reel in the line and load in order to prevent fouling of the arm.

Thus a pick-up equipment has been described which is rugged in construction and simple in operation. The many advantages will be readily apparent to those skilled in the art. An important advantage is the fact that the entire pick-up equipment, including the arm, may be stowed away wholly inside the plane. In addition, there is the advantage of allowing the pick-up operator to place the hook directly on the end of the arm. This not only facilitates the task of the pick-up operator, but also eliminates difficulties due to sliding the hook down the arm under certain conditions in other types of arms. Furthermore, the hook may be mounted in absolutely central position with respect to the arm, eliminating binding and twisting. Also, the storage of the complete arm wholly within the plane makes it possible to replace a damaged part of the arm, or even replace an entire pick-up arm, while in flight.

In addition, the telescopic construction with the beveled cam portions aligns the sections and minimizes fluttering of the arm. In the type of installation using a track, Fig. 10, there is the further advantage of being able to adjust the angle that the arm makes with respect to the axis of the plane for different kinds of pick-ups, and in addition, enables the operator to stow an arm easily, which may be exceptionally heavy or otherwise unwieldy due to installation requirements. The stationary skirt on the main guide pulley guides the pick-up line into the groove of the pulley should the line be laterally displaced due to difficult pick-up conditions and facilitates hauling the cargo on board.

Although the hereindescribed equipment has been tested in a Navy flying boat, it will be understood that the equipment may be used in other types of planes, including land planes.

Having thus described my invention, I claim:

1. In an air pick-up system, an airplane having a fuselage, an extensible pick-up arm comprising telescopic sections, a mounting inside said fuselage movably connecting an upper section of said pick-up arm and said fuselage, disconnectable means for rigidly holding said upper section in position for a pick-up operation, means for telescoping said pick-up arm, a hook detachably secured to the lower section of said arm, a pick-up line secured to said hook, and means for holding said line in said fuselage.

2. In an air pick-up system, an aircraft, a pick-up arm secured thereto, said pick-up arm comprising telescopic cylindrical tubular sections, self-aligning stops in said sections, said sections being rotatable with respect to each other in telescoped or in semitelescoped position but non-rotatable and self-aligning when in extended position, and a hook on the end of said arm.

3. In an air pick-up system, an aircraft, a pick-up arm secured thereto, said pick-up arm comprising telescopic tubular sections, said sections being connected by self-aligning joints, each of said joints comprising a tube connected to the inside of an upper section, a second tube connected to the outside of the lower section, said tubes having beveled abutting ends, said sections being rotatable with respect to each other so that said sections become self-aligning when extended, and a hook on the end of said arm.

4. In an air pick-up system, an airplane having a hull adapted to rest on water, said hull having a door in its bottom, an extensible pick-up arm comprising telescoping sections, devices for placing said sections in register when extended, a pick-up hook detachably secured to the lower section, a universal mounting connecting said upper section and the inside of said hull, a clamp connected to the hull near said door for positioning said upper section for a pick-up operation, a second clamp mounted in said hull for holding the arm in collapsed condition, a pick-up winch in said hull, a guide pulley journaled on said hull, a pick-up line connecting said hook running over said guide pulley and wound on said winch, and means for retracting said sections.

5. In an air pick-up system, an airplane having a hull adapted to rest on water, said hull having a door in its bottom and an upper deck, an extensible pick-up arm attached to the under side of the upper deck of said hull, said pick-up arm comprising telescoping sections, devices for placing said sections in register when extended, a pick-up hook detachably secured to the lower section, a bracket secured to said deck, a universal mounting connecting the upper section and bracket, a clamp on said hull near said door for positioning said upper section for a pick-up operation, a second clamp mounted in said hull for holding the arm in collapsed condition for storage, a pick-up winch in said hull, a pulley bracket secured to said hull near said door, a guide pulley journaled on said bracket, means for swinging said bracket to place said guide pulley in operative position in the door or clear of said door, a pick-up line connecting said hook running over said guide pulley and wound on said winch, a stationary skirt secured to said pulley bracket to guide said pick-up line to the pulley groove, a control line passing down through the center of said telescoping sections, a guide pulley on the top of the upper section, and a windlass attached to the hull for winding up said control line.

6. In an air pick-up system, an airplane having a fuselage with an opening, a track extending lengthwise of the plane and mounted within said fuselage, a carrier running on said track, an extensible pick-up arm comprising telescopic sections, means for connecting the upper section of said arm to said carrier, means for controlling lowering of said arm through said opening, and means on said fuselage for clamping said pick-up arm near said opening to position said pick-up arm for a pick-up operation.

7. In an air pick-up system, an airplane having a fuselage with a hatch, a monorail extending lengthwise of the airplane and attached to the underside of the top portion of said fuselage, a trolley running on said monorail, an extensible pick-up arm comprising telescopic sections, universal joint means for connecting the upper section of said arm to said trolley, means for controlling lowering of said arm through said hatch, and means on said fuselage for clamping said upper section near said hatch to position said pick-up arm for a pick-up operation.

8. A pick-up arm for air pick-up systems having a plurality of circular telescoping tubular upper sections, the upper-most section being secured in an aircraft, a lower telescoping section of solid construction, means for releasably positioning a pick-up hook at the lower tip of said solid section, a lug on said solid section for engaging the upper sections as the arm is collapsed, beveled stops attached inside the extremities of each section for aligning each section with respect to adjoining sections, and means for controlling lowering of and collapsing the arm.

9. In an air pick-up system, an airplane having a hull adapted to rest on water, said hull having a door in its bottom, an extensible pick-up arm attached inside the hull, said arm comprising round telescoping tubular sections, a universal joint attaching said arm and hull, internal self-aligning means secured at the ends of said sections for positioning a pick-up hook when the arm is extended, a pick-up hook detachably secured to the lower section of said arm, a clamp on the hull near said door for securing the arm when in operative position, a pick-up line secured to the pick-up hook, means on the hull for holding said line, and means for telescoping the arm.

10. In an air pick-up system, an airplane having a fuselage with a door in its under surface, an extensible pick-up arm attached inside said fuselage, said pick-up arm having a plurality of telescoping sections including an uppermost and a lowermost section, a pick-up hook detachably secured at the tip of the lowermost telescoping section, a universal mounting connecting the uppermost telescoping section and fuselage, whereby the arm may be secured in both an operative and an inoperative position without detachment from the fuselage, a clamp connected to the fuselage near said door for rigidly holding the uppermost section in operative position projected through said door for pick-up purposes, a pick-up line connected at one end to said hook, and means on said fuselage for holding the other end of said line.

11. In an air pick-up system, an airplane having a fuselage, a door in the bottom of said fuselage, a pick-up arm connected to and mounted inside said fuselage for projecting out through said door, an automatic retarding winch in said fuselage, a hook detachably connected to the end of said pick-up arm, a guide pulley, a pick-up line connected to said hook passing over said guide pulley and connected to said winch, said guide pulley comprising a frame, a mounting on said fuselage near said door, a hinge connecting said mounting and said frame, whereby said pulley may be swung into the door opening or away from said door opening to permit closing of the door, a pulley wheel journaled in said frame, said pulley wheel having a central groove and beveled side faces, a framework secured to said frame, and a stationary skirt on either side of said pulley wheel supported by said framework for guiding said pick-up line onto said beveled side faces.

12. An aligning stop for a telescopic arm including adjacent larger and smaller sections, said stop comprising a beveled annular member rigidly secured internally of said larger section and an abutting beveled annular member rigidly secured externally of said smaller telescoping section whereby the beveled faces of said annular members cooperate to align the arm when in an extended position.

WILLIAM JAMES MITCHELL.

REFERENCES CITED

The following references are of record in the file of this patent:

UNITED STATES PATENTS

| Number | Name | Date |
|---|---|---|
| Re. 22,212 | Kelton | Oct. 27, 1942 |
| 1,602,851 | Holt | Oct. 12, 1926 |
| 1,717,497 | Davis | June 18, 1929 |
| 1,735,385 | Fisher | Nov. 12, 1929 |
| 1,818,834 | Zimmerman | Aug. 11, 1931 |
| 1,822,658 | Kampmeyer | Sept. 8, 1931 |
| 2,014,557 | Clampitt | Sept. 17, 1935 |
| 2,131,610 | Arndt | Sept. 27, 1938 |
| 2,151,395 | Smith | Mar. 21, 1939 |
| 2,291,593 | Hubbard | July 28, 1942 |
| 2,319,881 | Ray | May 25, 1943 |
| 2,364,042 | Anderson | Dec. 5, 1944 |
| 2,373,414 | Plummer | Apr. 10, 1945 |

FOREIGN PATENTS

| Number | Country | Date |
|---|---|---|
| 322,910 | Great Britain | Dec. 19, 1929 |
| 374,356 | Germany | Apr. 27, 1923 |